US012613389B2

(12) United States Patent
Hajok et al.

(10) Patent No.: US 12,613,389 B2
(45) Date of Patent: Apr. 28, 2026

(54) LOCKING RING FOR A CABLE CLOSURE

(71) Applicant: CORNING RESEARCH & DEVELOPMENT CORPORATION, Corning, NY (US)

(72) Inventors: Johann Georg Hajok, Bochum (DE); Dayne Wilcox, El Cerrito, CA (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 310 days.

(21) Appl. No.: 18/204,249

(22) Filed: May 31, 2023

(65) Prior Publication Data

US 2023/0393343 A1 Dec. 7, 2023

Related U.S. Application Data

(60) Provisional application No. 63/356,738, filed on Jun. 29, 2022, provisional application No. 63/347,928, filed on Jun. 1, 2022.

(51) Int. Cl.
*G02B 6/44* (2006.01)
(52) U.S. Cl.
CPC ......... *G02B 6/4444* (2013.01); *G02B 6/4439* (2013.01); *G02B 6/44465* (2023.05)
(58) Field of Classification Search
CPC .......................... G02B 6/4444; G02B 6/44465
See application file for complete search history.

(56) References Cited

U.S. PATENT DOCUMENTS

| | | | | |
|---|---|---|---|---|
| 2,775,806 | A | * | 1/1957 | Love .......................... F16L 33/12 |
| | | | | 24/271 |
| 4,902,855 | A | * | 2/1990 | Smith .................. H02G 15/076 |
| | | | | 174/93 |
| 5,829,106 | A | | 11/1998 | Dams et al. |
| 6,473,945 | B1 | * | 11/2002 | Draper .................... F16L 23/06 |
| | | | | 24/270 |
| D584,604 | S | | 1/2009 | Baldwin |
| 7,828,340 | B2 | * | 11/2010 | Heelan, Jr. ............ F16L 21/065 |
| | | | | 285/410 |
| 2004/0256138 | A1 | | 12/2004 | Grubish et al. |
| 2017/0131510 | A1 | * | 5/2017 | Janssens ................. F16B 2/185 |
| 2021/0301958 | A1 | | 9/2021 | Magagna et al. |

FOREIGN PATENT DOCUMENTS

| | | |
|---|---|---|
| CN | 1077072 C | 1/2002 |
| DE | 102019125763 A1 | 3/2021 |
| WO | 2016/037557 A1 | 3/2016 |

OTHER PUBLICATIONS

European Patent Application No. 23176527.2, Extended European search report dated Oct. 20, 2023, 10 pages, European Patent Office.

* cited by examiner

*Primary Examiner* — Michael Stahl
(74) *Attorney, Agent, or Firm* — Tamika A. Crawl-Bey

(57) ABSTRACT

A locking ring for assembly onto a cable closure includes a locking ring includes at least two ring sections, with each ring section having at least one locking structure; and a lever that couples with the at least two ring sections. The lever includes at least one locking rib disposed therein, and the at least one locking rib is configured to engage and disengage from the at least one locking structure such that the lever moves from a closed position in which proximal ends of each ring section are substantially adjacent to an open position in which proximal ends of each ring section are separate.

20 Claims, 5 Drawing Sheets

DETAIL 3B-3B

DETAIL 3A-3A

DETAIL 3B-3B

LOCKING RING FOR A CABLE CLOSURE

CROSS-REFERENCE TO RELATED APPLICATIONS

This application claims priority to U.S. Provisional Application Nos. 63/347,928, filed Jun. 1, 2022, and 63/356,738, filed Jun. 29, 2022. Each aforementioned priority application is incorporated herein by reference in its entirety.

BACKGROUND

Closures are used to environmentally protect the fiber cable and splice connections. Many types of closures are provided with some type of mechanism, which is used to aid in environmentally protecting inner components of the closures.

In some cases, the closures are provided with some type of ring that surrounds the base of the closure. In such cases, sufficient forces must be applied to the ring to adequately close and seal the closure. Because the forces typically applied can be relatively high, it may be difficult for an installer to close the ring without assistance or use of another device. In addition to requiring skilled operators, this difficulty can increase installation time. For these reasons, among others, there is a need for improved locking rings for assembly onto cable closures used in the telecommunications industry.

SUMMARY

Disclosed herein are various embodiments of locking rings configured for assembly onto a cable closure and cable closures configured to use such locking rings.

According to a first aspect, a locking ring includes at least two ring sections, each ring section having at least one locking structure; and a lever that couples with the at least two ring section, the lever comprising at least one locking rib disposed therein, and wherein the at least one locking rib is configured to engage and disengage from the at least one locking structure such that the lever moves from a closed position in which proximal ends of each ring section are substantially adjacent to an open position in which proximal ends of each ring section are separate.

According to a second aspect, a cable closure includes a housing having an outer surface; and a locking ring, positionable onto at least a portion of the outer surface of the housing. The locking ring at least two ring sections, each ring section having at least one locking structure; and a lever that couples with the at least two ring section, the lever comprising at least one locking rib disposed therein, and wherein the at least one locking rib is configured to engage and disengage from the at least one locking structure such that the lever moves from a closed position in which proximal ends of each ring section are substantially adjacent to an open position in which proximal ends of each ring section are separate.

Additional aspects, features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

Figure 1:
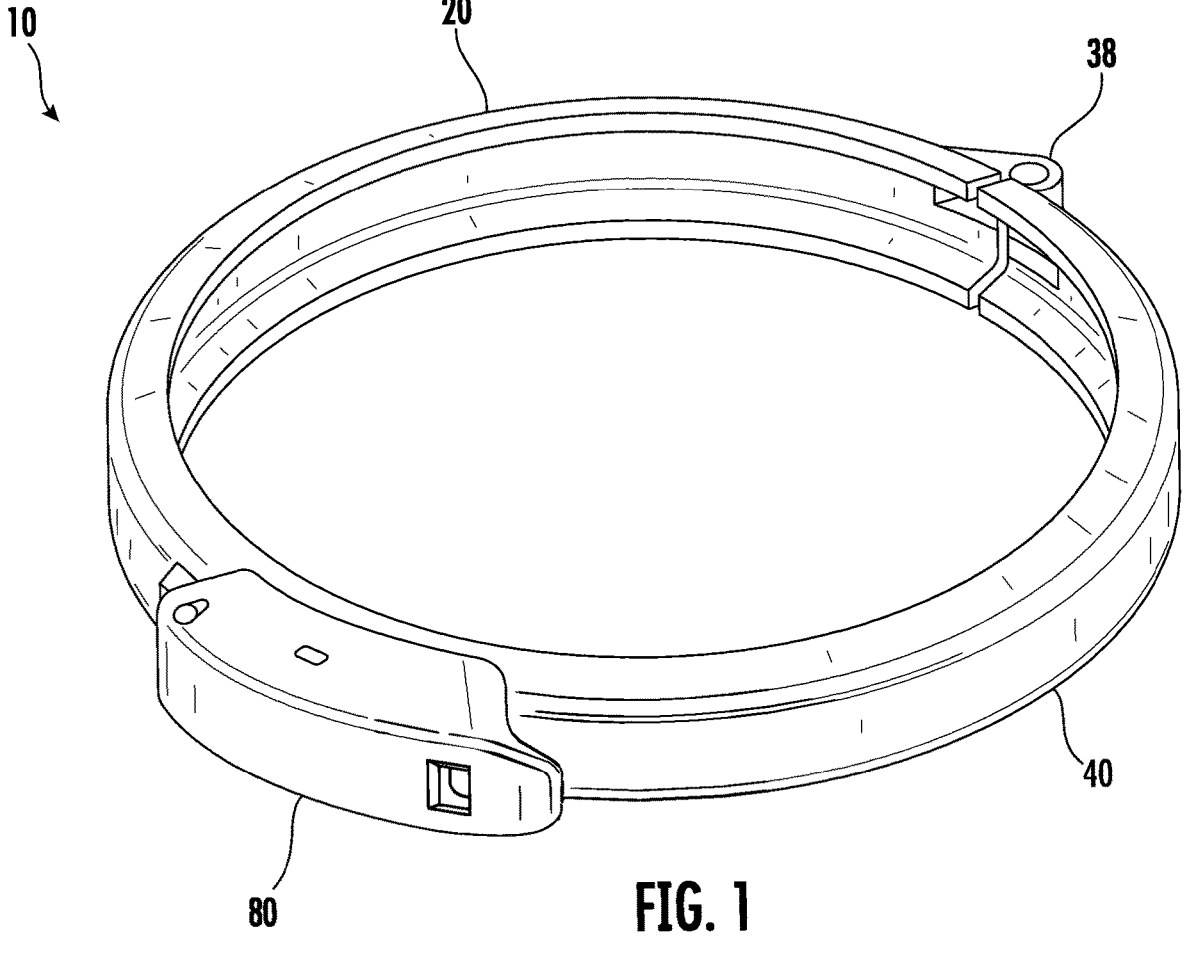
FIG. 1 is an isometric view of a locking ring in accordance with embodiments disclosed herein.
Figure 3A:
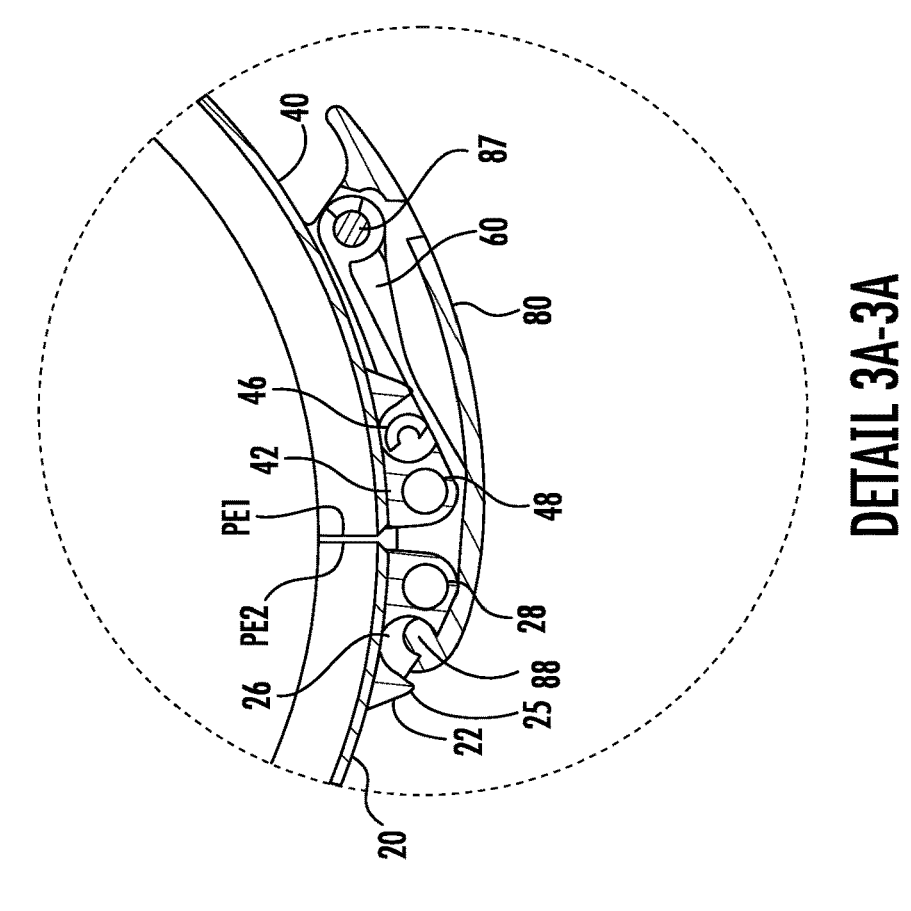
FIG. 3A is a cross-sectional top view of the locking ring shown in FIG. 1 with the lever in a closed position.
Figure 3A:
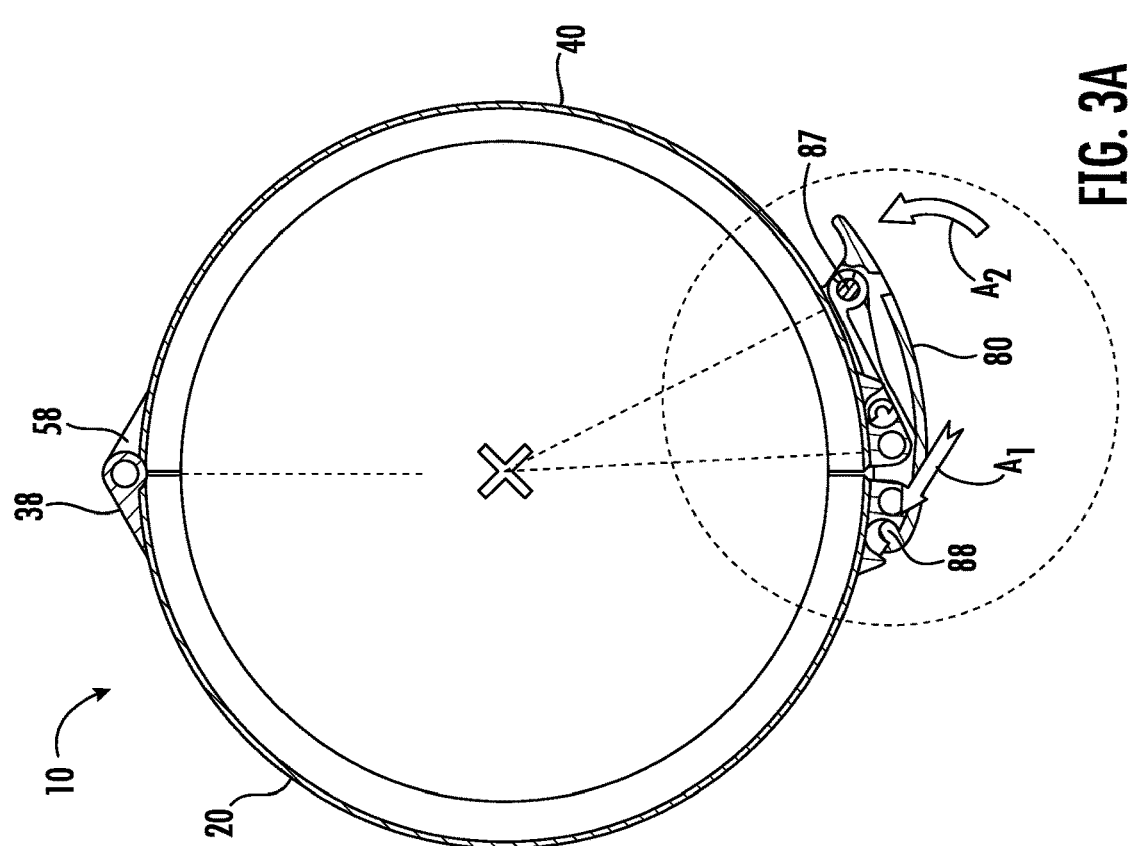
Figure 3B:
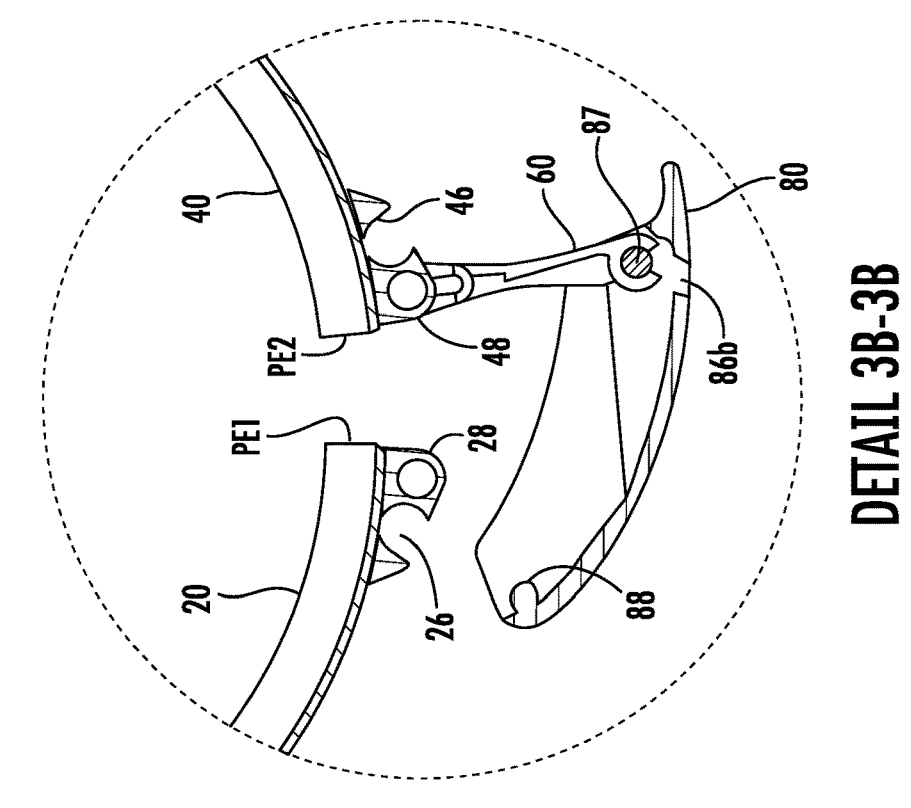
Figure 3B:
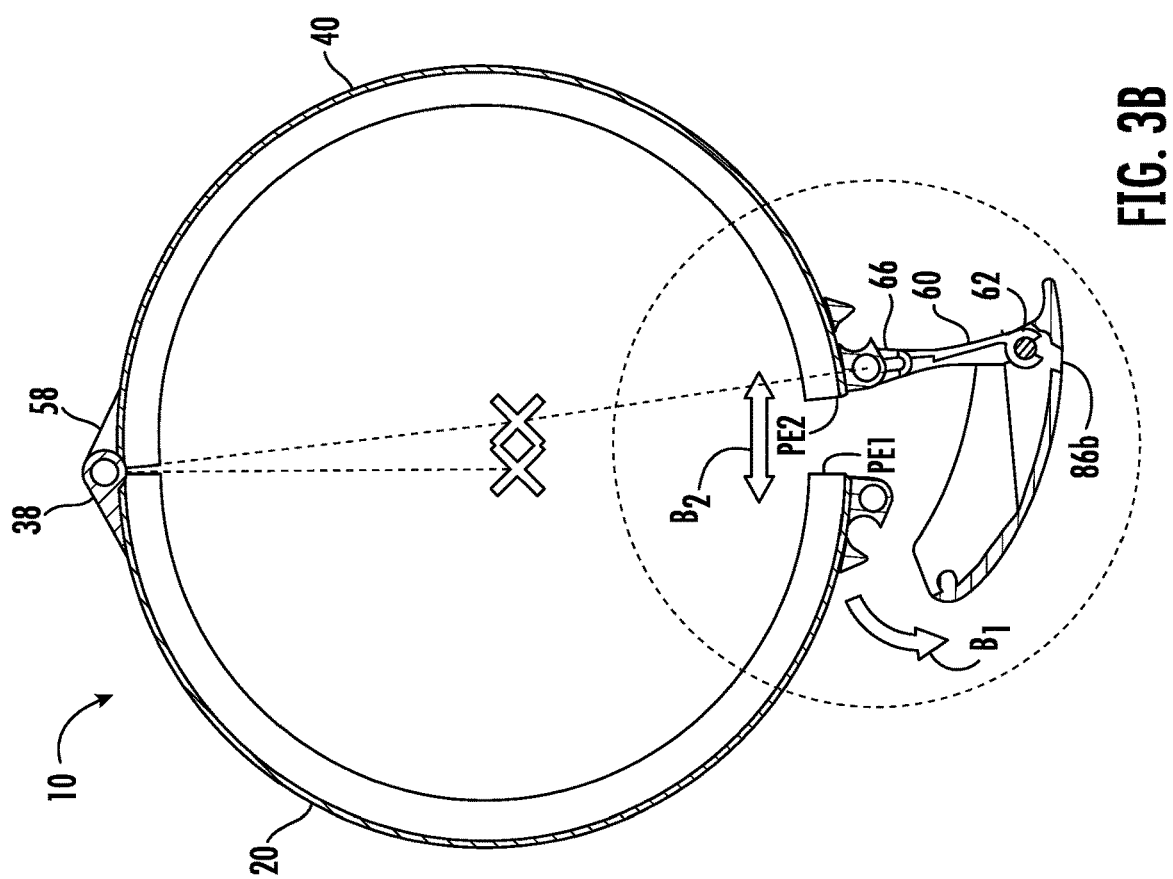
Figure 4:
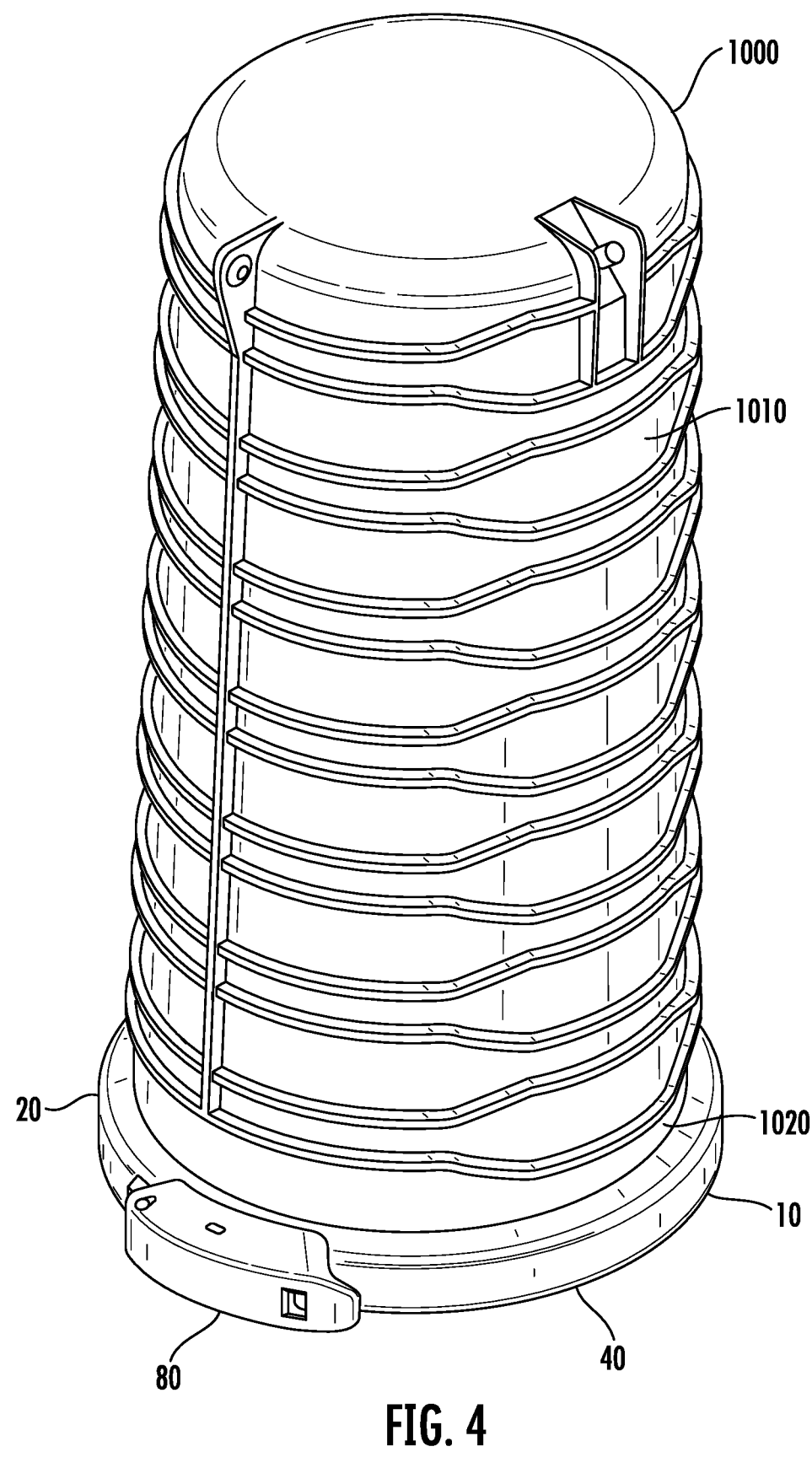

DETAIL 3A-3A is an enlarged detailed view of the portion of FIG. 3A shown within a circle;

FIG. 3B is a cross-sectional top view of the locking ring shown in FIG. 1 with the lever in an open position;

DETAIL 3B-3B is an enlarged detailed view of the portion of FIG. 3B shown within a circle; and FIG. 4 is an isometric view of an exemplary closure assembled with a locking ring in accordance with embodiments disclosed herein.

The figures are not necessarily to scale. Like numbers used in the figures may be used to refer to like components. However, it will be understood that the use of a number to refer to a component in a given figure is not intended to limit the component in another figure labeled with the same number.

DETAILED DESCRIPTION

Various exemplary embodiments of the disclosure will now be described with particular reference to the drawings. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the features and limitations set forth in the claims and any equivalents thereof.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

Cartesian coordinates are used in some of the Figures for reference and are not intended to be limiting as to direction or orientation.

For purposes of description herein, the terms "upper," "lower," "right," "left," "rear," "front," "vertical," "horizontal," "top," "bottom," "side," and derivatives thereof, shall relate to the disclosure as oriented with respect to the Cartesian coordinates in the corresponding Figure, unless stated otherwise. However, it is to be understood that the disclosure may assume various alternative orientations, except where expressly specified to the contrary.

For the purposes of describing and defining the subject matter of the disclosure it is noted that the terms "substantially" and "generally" may be utilized herein to represent the inherent degree of uncertainty that may be attributed to any quantitative comparison, value, measurement, or other representation.

FIGS. 1-4 illustrate an embodiment of a locking ring 10 for assembly onto a cable closure 1000 (FIG. 4). The locking ring 10 includes a first ring section 20, a second ring section 40, and a lever 80 configured to facilitate coupling of the first ring section 20 with the second ring section 40. The ring sections 20, 40 are mated via assemblies, which include elements from both the first ring section 20, the second ring section 40, and the lever 80, as will be further described herein.

Figure 2:
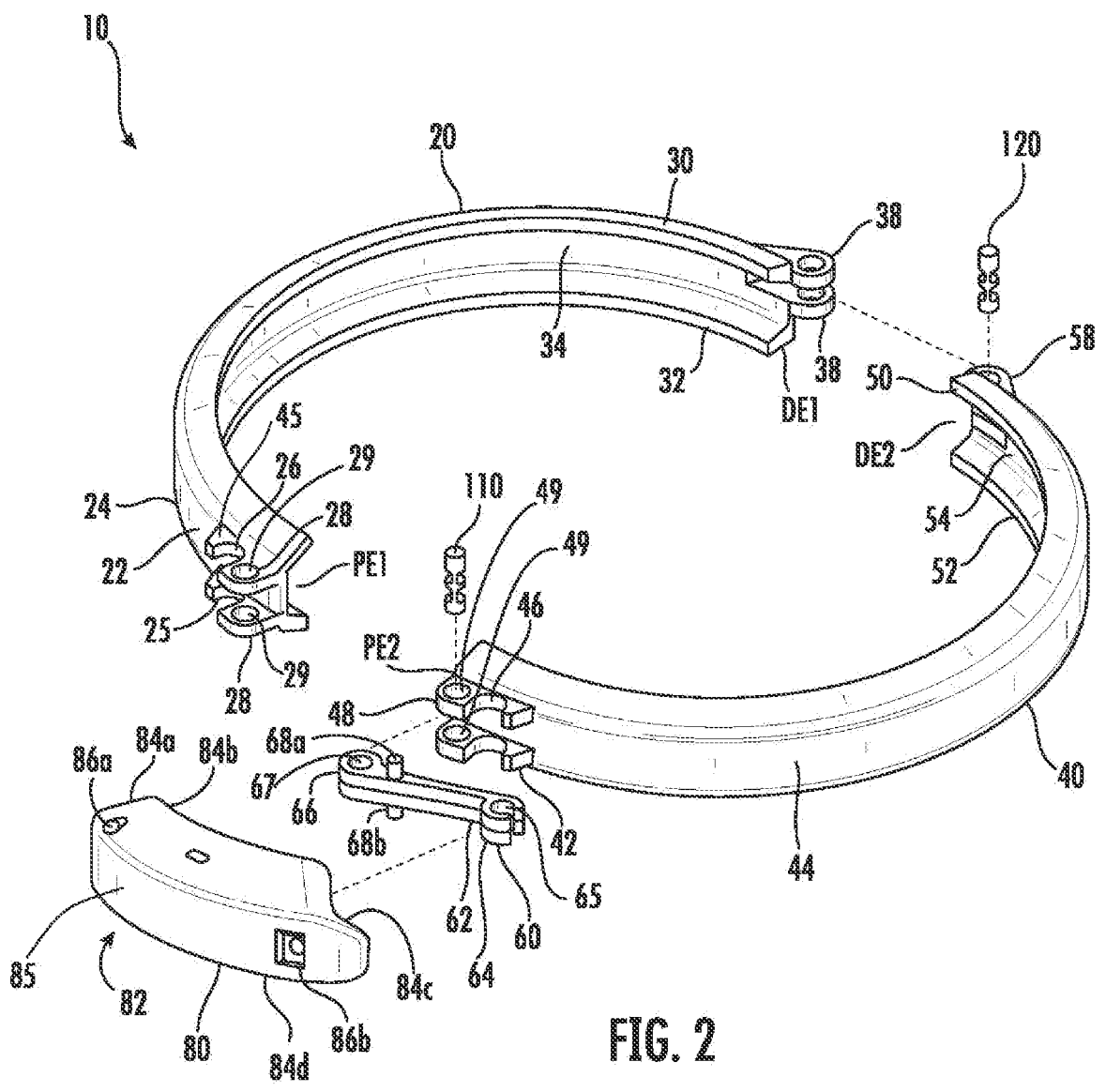
FIG. 2 is an exploded view of the locking ring shown in FIG. 1.

FIG. 1 is an assembled view of the locking ring 10, while FIG. 2 is an exploded view of the locking ring 10, showing additional components therein. The locking ring 10 includes at least one locking structure 22, 42 positioned on proximal ends PE1, PE2, at least one hinge element 38, 58 positioned on distal ends DE1, DE2, a bracket 60, and a lever 80. Each locking structure 22, 42 includes tangs 25, 45, cut out portions 26, 46, and connector receiving portions 28, 48 with thru-holes 29, 49.

In preferred embodiments, the first ring section 20 includes upper and lower locking structures, with each locking structure having at least a tang, a cut out portion, a receiving portion, and a thru-hole. Each locking structure 22, 42 preferably extends outwardly from an outer surface 24, 44 of each ring section 20, 40. The locking structures 22, 42 are configured to mate upon assembly of the locking ring. In the embodiment shown, the locking structures 22, 42 interlock such that one locking structure is positioned above or below the other locking structure.

Each ring section 20, 40 further includes upper inner rims 30, 50 and lower inner rims 32, 52 which extend inwardly toward a central axis of the locking ring, and a medial body section 34, 54 positioned between the upper inner rim 30 and the lower inner rim 32.

To facilitate coupling of the first ring section 20 to the second ring section 40, each ring section additionally includes hinge elements 38, 58 located at the distal ends DE1, DE2 of each ring section. Preferably at least two hinge elements 38, 58 are included on each ring section—an upper hinge element and a lower hinge element, as particularly shown in FIG. 2. Hinge element 38 extends from the outer surface 24 of the first ring section 20 and hinge element 58 extends from the outer surface 44 of the second ring section 40. The hinge elements 38, 58 are configured to mate upon assembly of the locking ring. In the embodiment shown, hinge elements 38, 58 are configured to interlock such that one hinge element is positioned above or below the other hinge element. In this embodiment, as particularly shown in FIGS. 1 and 3A, hinge element 38 is positioned above hinge element 58.

Referring particularly to FIGS. 2, 3A, and 3B, the bracket 60 includes a bracket body 62 having an insertion end 64 with a c-shaped aperture 65 and a receiving end 66 having a thru-hole 67. The insertion end 64 couples with the lever 80 and a receiving end 66 couples with locking structures 22, 42. The bracket 60 additionally includes pin elements 68a, 68b configured for coupling with the lever 80 and/or the ring sections 20, 40. The pin elements 68a, 68b may also be used to assist with positioning of the lever 80 and/or the ring sections 20, 40.

Connectors 110, 120 are used to assemble the respective components of the locking ring 10 together. Proximal end connector 110 is configured to couple proximal ends PE1, PE2 with the bracket 60. Specifically, proximal end connector is positionable within thru-holes 49 Distal end connector 120 is configured to couple distal ends DE1, DE2 together with hinge elements 38, 58, as particularly shown in FIGS. 3A and 3B.

Referring to FIGS. 3A-3B, the locking ring 10 is shown in cross-section to further illustrate how the ring sections 20, 40 and the lever 80 are configured to mate with locking structures 22, 42, the bracket 60, and the lever 80. FIG. 3A shows how the lever 80 is movable in a closed position in which an end of the first ring section 20 is substantially adjacent to an end of the second ring section 40. FIG. 3B illustrates how the lever 80 is in an open position that separates the end of the first ring section from the end of the second ring section.

As shown particularly in FIGS. 1 and 2, the lever 80 has an ergonomic curved profile 82 that facilitates moving the position of the lever when assembled with the respective elements of the locking ring 10. The lever profile 82 includes curved edges 84a, 84b, 84c, 84d, and a curved outer surface 85. Disposed in the lever are at least two notches 86a, 86b that may be used to visually determine where interior components of the lever are positioned. As shown particularly in FIG. 3A, DETAIL 3A-3A, FIG. 3B, and DETAIL 3B-3B, interior elements of the lever include at least one bracket rib 87 and at least one locking rib 88. The at least one bracket rib 87 is configured for connection to the at least one locking structure such that the lever is movable from a closed position in which proximal ends of each ring section are substantially adjacent. The at least one locking rib 88 is configured for connection to the at least one locking structure such that the lever is movable from a closed position in which proximal ends of each ring section are substantially adjacent to an open position in which proximal ends of each ring section are separate. Arrow A1 shown in FIG. 3A illustrates how the locking rib is positioned within the cut out portion 26 of the locking structure 22 with arrow A2 illustrating the relative movement of the lever 80 to slide the locking rib 88 into position and engagement with the locking structure 22.

Arrow B1 shown in FIG. 3 illustrates the relative movement of the lever 80 to slide the locking rib 88 out of position and disengagement with the locking structure 22. Arrow B2 illustrates the relative movement and separation of the proximal ends PE1, PE2 of the ring sections 20, 40. Preferably, the relative movement of the lever is akin to sliding in and out of engagement such that an operator can move the lever without the use of tools. Moreover, the ergonomic profile of the lever is such that an operator could use a thumb or other finger to initiate movement of the lever and thus engage and disengage the locking rib with the locking structure.

FIG. 4 illustrates how the locking ring 10 can be positioned onto a cable closure 1000. The cable closure 1000 includes a housing 1010, having a dome-like shape with an outer surface 1020. The locking ring 10 is shown positioned on the outer surface 1020 of the housing 1010.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the embodiments disclosed herein should be construed to include everything within the scope of the appended claims and their equivalents.

What is claimed is:

1. A locking ring configured for assembly onto a cable closure, the locking ring comprising:
   at least two ring sections, each ring section having at least one locking structure; and
   a lever that couples with the at least two ring sections, the lever comprising at least one locking rib and at least one bracket rib disposed therein, and wherein the at least one locking rib and the at least one bracket rib are configured for connection to the at least one locking structure such that the lever moves from a closed position in which proximal ends of each ring section are substantially adjacent to an open position in which proximal ends of each ring section are separate, and wherein the lever further comprises an outer surface having at least two notches to visually determine where interior components of the lever are positioned.

2. The locking ring of claim 1, wherein the at least one locking structure is positioned on a proximal end of at least one of the at least two locking rings.

3. The locking ring of claim 1, wherein the at least one locking structure comprises at least one tang, at least one cut out portion, and at least one connector receiving portion.

4. The locking ring of claim 3, wherein a thru-hole is defined in the at least one connector receiving portion.

5. The locking ring of claim 1, wherein each ring section includes an upper and a lower locking structure.

6. The locking ring of claim 1, wherein each locking structure extends outwardly away from an outer surface of each ring section.

7. The locking ring of claim 1, wherein the locking ring further comprises at least two locking structures configured to interlock.

8. The locking ring of claim 1, further comprising a bracket configured to mate with at least one of the at least two ring sections.

9. The locking ring of claim 8, wherein the bracket comprises a bracket body having an insertion end that couples with the lever and a receiving end that couples with the at least one locking structure.

10. The locking ring of claim 1, further comprising a hinge structure configured to connect distal ends of the at least two ring sections.

11. A cable closure, comprising:
   a housing having an outer surface; and
   a locking ring, positionable onto at least a portion of the outer surface of the housing, the locking ring comprising:
      at least two ring sections, each ring section having at least one locking structure; and
      a lever that couples with the at least two ring sections, the lever comprising at least one locking rib and at least one bracket rib and at least one bracket rib disposed therein, wherein the at least one locking rib and the at least one bracket rib are configured for connection to the at least one locking structure such that the lever moves from a closed position in which proximal ends of each ring section are substantially adjacent to an open position in which proximal ends of each ring section are separate, and wherein the lever further comprises an outer surface having at least two notches to visually determine where interior components of the lever are positioned.

12. The cable closure of claim 11, wherein the at least one locking structure is positioned on a proximal end of at least one of the at least two locking rings.

13. The cable closure of claim 11, wherein the at least one locking structure comprises at least one tang, at least one cut out portion, and at least one connector receiving portion.

14. The cable closure of claim 13, wherein a thru-hole is defined in the at least one connector receiving portion.

15. The cable closure of claim 11, wherein each ring section includes an upper and a lower locking structure.

16. The cable closure of claim 11, wherein each locking structure extends outwardly away from an outer surface of each ring section.

17. The cable closure of claim 11, wherein the locking ring further comprises at least two locking structures configured to interlock.

18. The cable closure of claim 11, further comprising a bracket configured to mate with at least one of the at least two ring sections.

19. The cable closure of claim 18, wherein the bracket comprises a bracket body having an insertion end that couples with the lever and a receiving end that couples with the at least one locking structure.

20. The cable closure of claim 11, further comprising a hinge structure configured to connect distal ends of the at least two ring sections.

* * * * *